United States Patent [19]
Van Ness et al.

[11] 3,722,476
[45] Mar. 27, 1973

[54] FEEDING BOWL FOR ANIMALS

[76] Inventors: Paul J. Van Ness; William A. Van Ness, both of 42 Vincent Drive, Clifton, N.J. 07011

[22] Filed: Sept. 16, 1971

[21] Appl. No.: 181,085

[52] U.S. Cl. .................................................... 119/61
[51] Int. Cl. .................................................. A01k 5/00
[58] Field of Search .......................................... 119/61

[56] References Cited

UNITED STATES PATENTS

| | | |
|---|---|---|
| 2,554,086 | 5/1951 | Block .................................... 119/61 |
| 1,562,620 | 11/1925 | Dill ........................................ 119/61 |
| 3,202,131 | 8/1965 | Jones .................................... 119/61 |

FOREIGN PATENTS OR APPLICATIONS

| | | | |
|---|---|---|---|
| 12,941 | 9/1884 | Great Britain ........................ 119/61 |

*Primary Examiner*—Hugh R. Chamblee
*Attorney*—Nathaniel L. Leek

[57] ABSTRACT

A bowl for feeding animals having bottom and side walls and a depending skirt composed of plastic, the walls and skirt being relatively thick to provide distributed weight. The skirt and side walls have a slope to provide a span which is difficult for the animal to grasp in its jaws.

5 Claims, 4 Drawing Figures

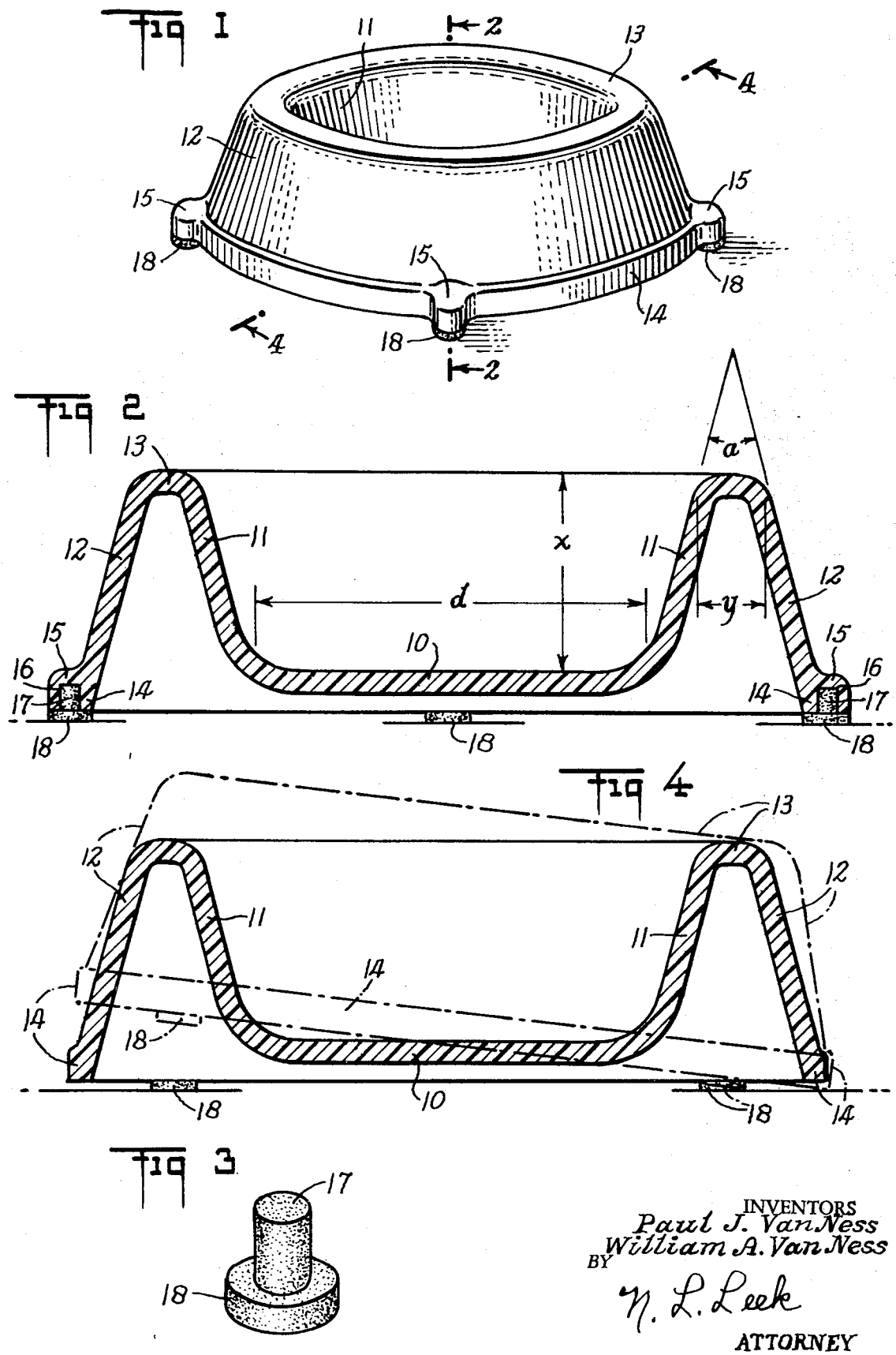

FEEDING BOWL FOR ANIMALS

This invention relates to feeding bowls for animals and has for an object to provide a bowl of the above type having novel and improved characteristics.

A more specific object is to provide a bowl which is stable against movement on the floor and against being upset by the animal.

Another object is to provide a bowl having a rim so designed that it would be difficult for the animal to bite or grasp the rim.

Another object is to provide such a bowl wherein the weight is so distributed as to impart a high degree of stability to the article.

Another object is to provide such a bowl with anti-friction feet which are disposed to prevent slippage on the floor without decreasing the stability of the article.

Various other objects and advantages will be apparent as the nature of the invention is more fully disclosed.

The nature of the invention will be better understood from the following description, taken in connection with the accompanying drawing in which a specific embodiment has been set forth for purposes of illustration.

In the drawing:

FIG. 1 is a perspective view of a feeding bowl embodying the invention;

FIG. 2 is a transverse section taken on the line 2—2 of FIG. 1 showing the arrangement of the skirt and supporting feet;

FIG. 3 is a detail view, on an enlarged scale, of one of the supporting feet; and FIG. 4 is a section taken on the line 4—4 of FIG. 1 showing the arrangement of the skirt and feet to minimize the likelihood of upsetting the bowl.

Referring to the drawing more in detail the bowl is shown as molded in one piece of a plastic which is preferably of the thermoplastic type and is sufficiently hard when set and cured as to strongly resist the teeth of the animal. Also the walls are sufficiently thick and heavy to impart the desired weight and to so distribute the weight as to impart a high degree of stability to the article. Polyethylene and polypropylene are examples of thermoplastic material which are suitable for this purpose.

More specifically, the bowl includes a substantially flat bottom wall 10 and a side wall 11 forming the dish portion. An outer depending skirt 12 is joined to the side wall 11 by a smoothly curved lip portion 13 with its lower rim 14 extending slightly below the bottom wall 10 so that the entire support for the bowl is from the lower rim 14. Both the inner wall 11 and the outer skirt 12 flare outwardly at an angle such that the teeth of the feeding animal would tend to slip upwardly over the lip 13. The lip 13 has a width such that the spacing of the inner surface of the inner wall 11 and the outer surface of the skirt 12 would make it difficult for the feeding animal to grasp the rim in its mouth.

A plurality of sockets 15 having bores 16 adapted to receive the leg portions 17 of feet 18 are disposed around the periphery of the skirt 12. The feet 18 are composed of a high friction plastic or synthetic rubber and are of a thickness such that the lower edge 14 of the skirt 12 contacts the floor if the rim is pressed downwardly by the feeding animal and thus prevents the bowl from being upset.

It is to be understood that the size, weight and hardness of the material and the nature of the plastic will be selected in accordance with the size and nature of the animal for which the bowl is to be used. It has been found that the wall height $x$ as indicated on FIG. 2 should be about one-half of the diameter $d$ of the bottom wall 10. The width $y$ which represents the span between the inner surface of the wall 11 and the outer surface of the skirt 12 at the top of the wall 11 should be so related that the distance $y$ is greater than one-third of the distance $x$. This imparts a slope to the walls and a span such that the walls would be difficult for the feeding animal to grasp in its jaws if the size of the bowl is properly related to the size of the animal being fed. Also the angle $a$ between the inner surface of the wall 11 and the outer surface of the skirt 12 should be at least 30° in order to increase the difficulty of obtaining a grip on the rim.

The scope of the invention is set forth in the following claims.

What is claimed is:

1. A bowl for feeding animals having a dish portion composed of bottom and side walls and a depending skirt portion having its lower rim extending below the level of said bottom to form the sole support for the bowl, the inner surface of the side wall and the outer surface of the skirt having a relative angle of at least 30 degrees, said walls and skirt being relatively thick and composed of a thermoplastic material in the cured and set state, said bowl having sockets for receiving feet disposed peripherally around the outside of said skirt, and feet of high friction plastic material disposed in said sockets, the lower edge of said skirt rim between adjacent feet being disposed to contact the floor to limit the tilting of said bowl.

2. A bowl as set forth in claim 1 in which the span between the outer surface of the skirt and the inner surface of the side wall at the top is at least one-third of the height of the side wall and the height of the side wall is about one-half the internal diameter of the bowl.

3. A bowl as set forth in claim 1 in which said feet are composed of a high friction synthetic rubber.

4. A bowl as set forth in claim 1 in which the bowl is composed of polyethylene.

5. A bowl as set forth in claim 1 in which the bowl is composed of polypropylene.

* * * * *